(12) United States Patent
Brucker et al.

(10) Patent No.: US 8,959,646 B2
(45) Date of Patent: Feb. 17, 2015

(54) AUTOMATED DETECTION AND VALIDATION OF SANITIZERS

(71) Applicants: Achim D. Brucker, Karslruhe (DE); Tim Herres, Ulm (DE)

(72) Inventors: Achim D. Brucker, Karslruhe (DE); Tim Herres, Ulm (DE)

(73) Assignee: SAP SE, Walldorf (DE)

( * ) Notice: Subject to any disclaimer, the term of this patent is extended or adjusted under 35 U.S.C. 154(b) by 120 days.

(21) Appl. No.: 13/925,051

(22) Filed: Jun. 24, 2013

(65) Prior Publication Data

US 2014/0380486 A1    Dec. 25, 2014

(51) Int. Cl.
*H04L 29/06* (2006.01)
*G06F 21/00* (2013.01)
*G06F 21/57* (2013.01)

(52) U.S. Cl.
CPC .................................. *G06F 21/577* (2013.01)
USPC ......................................................... 726/25

(58) Field of Classification Search
CPC ................................................... G06F 21/577
See application file for complete search history.

(56) References Cited

U.S. PATENT DOCUMENTS

| 2008/0104384 A1* | 5/2008 | Rios et al. ........................ 713/2 |
| 2008/0301205 A1* | 12/2008 | Alpern et al. ................. 707/205 |
| 2014/0237604 A1* | 8/2014 | Guarnieri et al. ............... 726/25 |

* cited by examiner

*Primary Examiner* — Lisa Lewis
(74) *Attorney, Agent, or Firm* — Fish & Richardson P.C.

(57) ABSTRACT

Methods, systems, and computer-readable storage media for analyzing security of dataflows in programs. In some implementations, actions include processing source code using static analysis to: identify one or more dataflows and one or more candidate sanitizers, each candidate sanitizer being associated with a respective dataflow, and provide an executable sub-program for each candidate sanitizer to provide one or more executable sub-programs, processing the one or more executable sub-programs using dynamic analysis to: execute the one or more executable sub-programs, and provide dynamic analysis results, providing combined results based on the static analysis and the dynamic analysis, the combined results including the dynamic analysis results, and assigning a priority to each result in the combined results.

17 Claims, 5 Drawing Sheets

AUTOMATED DETECTION AND VALIDATION OF SANITIZERS

BACKGROUND

Static Application Security Testing (SAST) is a technique that statically analyzes program source code to detect problems within the source code. That is, SAST performs such analysis without actually executing (running) the source code. In some examples, problems within the source code can compromise the security of a computer program. Such problems can be caused by unchecked (un-validated) data-flows from a sink, e.g., input from a user, to a source, e.g., access to a database.

A problem that a SAST tool has to solve is to detect whether a dataflow between a sink and a source contains a sanitizer. In some examples, sanitizers include functions that validate the data from the source. Some SAST tools use a pre-defined list of sanitizers, which has several limitations. For example, a pre-defined list could be incomplete, such that it does not contain a particular function that is provided in the source code and that correctly sanitizes input. This results in false positives, where false warnings are indicated and need to be manually analyzed, which is labor-intensive and, thus, costly. As another example, a pre-defined list only includes static information about the sanitizers that can be coarse-grained. This can result in incorrect detection of sanitizers. This results in false negatives, where actual vulnerabilities that are not reported.

SUMMARY

Implementations of the present disclosure include computer-implemented methods for analyzing security of data-flows in programs. In some implementations, actions include processing source code using static analysis to: identify one or more dataflows and one or more candidate sanitizers, each candidate sanitizer being associated with a respective dataflow, and provide an executable sub-program for each candidate sanitizer to provide one or more executable sub-programs, processing the one or more executable sub-programs using dynamic analysis to: execute the one or more executable sub-programs, and provide dynamic analysis results, providing combined results based on the static analysis and the dynamic analysis, the combined results including the dynamic analysis results, and assigning a priority to each result in the combined results.

In some implementations, processing source code includes providing a representation of the source code, the one or more dataflows being identified from the representation.

In some implementations, the representation includes a graph including nodes and edges between nodes.

In some implementations, providing an executable sub-program for each candidate sanitizer includes: extracting a sub-program from the source code, removing one or more sinks present in the sub-program, and embedding code of the sub-program in a function skeleton that enables the code to be called directly.

In some implementations, actions further include providing static analysis results based on processing the source code using static analysis.

In some implementations, the static analysis results include source-sink-pairs, the one or more candidate sanitizers, and the one or more executable sub-programs.

In some implementations, the combined results further include the static analysis results.

In some implementations, processing the one or more executable sub-programs using dynamic analysis includes providing one or more test cases for the one or more executable sub-programs.

In some implementations, a test case of the one or more test cases is provided based on a context of a respective executable sub-program.

In some implementations, the context includes at least one of a source associated with a candidate sanitizer of the respective executable program, and a sink associated with the candidate sanitizer of the respective executable program.

In some implementations, a test case of the one or more test cases is provided based on a candidate sanitizer associated with a respective executable sub-program.

In some implementations, executing the one or more executable programs includes executing each executable sub-program based on a respective test case.

In some implementations, executing the one or more executable sub-programs includes executing each executable sub-program in isolation.

In some implementations, the dynamic results indicate whether each candidate sanitizer properly functions.

In some implementations, actions further include providing the combined results and respective priorities for display to a user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to dynamically testing potential sanitation functions during Static Application Security Testing (SAST). In some implementations, potential sanitations functions are tested within a sandboxed environment, and in the context that they are actually used. As discussed in further detail herein, implementations of the present disclosure address limitations, such as those discussed above, of some SAST tools. More specifically, implementations of the present disclosure provide significantly lower false positive rates and false negative rates during SAST.

In further detail, implementations of the present disclosure are directed to analyzing security of dataflows in programs to detect the presence of sanitizers, e.g., known and/or unknown sanitizers, and to determine whether detected sanitizers are functioning as intended within the programs. In some implementations, static analysis (or testing) and dynamic analysis (or testing) are combined. In some implementations, static analysis is executed to automatically extract sanitation functions from source code, to statically analyze respective contexts of the sanitation functions, and to generate respective test cases based on the usage of the sanitation functions. In some implementations, dynamic analysis is executed to dynamically test the sanitation functions based on the respective test cases, and to provide test results. In some examples, the dynamic analysis is executed in isolation, e.g., a sandboxed environment. In some examples, the test results are used in static analysis of the source code, e.g., for prioritization of findings.

Figure 1:
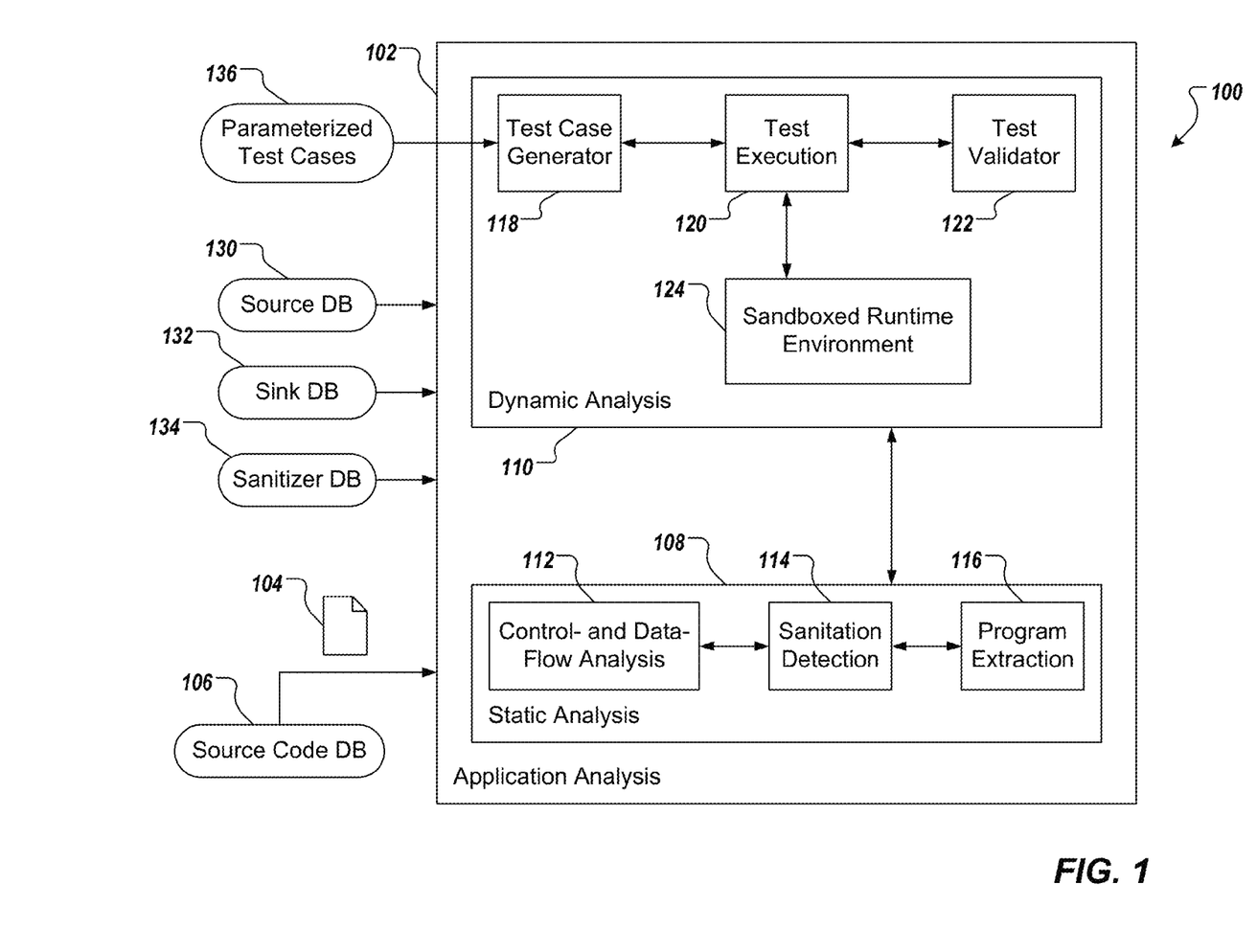
FIG. 1 depicts an example high-level architecture in accordance with implementations of the present disclosure.

FIG. 1 depicts an example architecture 100 in accordance with implementations of the present disclosure. The example architecture 100 includes an application analysis component 102 that analyzes source code 104 provided from a source code database 106. In some examples, the application analysis component 102 is provided as one or more computer-executable programs that are executed using one or more computing devices. In some examples, the source code 104 is provided as a computer-readable file that can be read and processed by the application analysis component.

In the depicted example, the application analysis component 102 includes a static analysis sub-component 108 and a dynamic analysis sub-component 110. The static analysis sub-component includes a control- and data-flow analysis sub-component 112, a sanitation detection component 114 and a program extraction sub-component 116. The dynamic analysis sub-component 110 includes a test case generator sub-component 118, a test execution sub-component 120, a test validator sub-component 122 and a sandboxed runtime environment sub-component 124. The example architecture 100 further includes a source database 130, a sink database 132, a sanitizer database 134 and a database of parameterized test cases 136. As discussed in further detail herein, the application analysis component 102 processes information provided from each of the databases 130, 132, 134, 136.

In further detail, the application analysis component 100 receives (or retrieves) source code 104 for a program that is to be analyzed (the "program under test"). In some examples, the source code 104 is provided as a computer-readable file and can be provided in a programming language, e.g., Java, JavaScript, Bytecode. The static analysis sub-component 108 statically analyzes the source code 104 and uses, if necessary, the dynamic analysis sub-component 110 to improve the overall results, as discussed in further detail herein. The control- and data-flow analysis sub-component 112 processes the source code 104 to provide an abstract control-flow representation and an abstract dataflow representation. The sanitation detection sub-component 114 processes the abstract representations and implements heuristics to detect potential sanitizers as well as heuristics for analyzing the context in which sanitizers are used. The program extraction sub-component 116 processes information from the sanitation detection sub-component 114 to provide a minimal sub-program that can be executed, e.g., that is self-contained.

In some examples, the dynamic analysis sub-component 110 uses dynamic, e.g., run-time, testing techniques to analyze sub-programs (provided from the static analysis sub-component 108) in a sand-boxed environment. The test case generator sub-component 118 provides concrete test data for test cases. In some examples, this can be achieved by applying specific algorithms or by instantiating test cases retrieved from the database of parameterized test cases 136. In some examples, test cases can be retrieved based on the sub-program that is being tested. The database of parameterized test cases 136 stores pre-configured abstract test cases. In some examples, the test cases can be universal or only be useful for a specific sink, source, and/or sanitizer type (or a combination thereof). Moreover, the actual context of the sanitizers use, e.g., character or transport encodings, plays a role. The test execution sub-component 120 provides the generic test harness and drivers used for executing the dynamic tests. In some examples, the test execution sub-component 120 resets the runtime. In some examples, the test validator sub-component 122 validates the results of the dynamic tests. For example, the test validator component 122 can check actual behavior against expected (specified) behavior. In some examples, the sandboxed runtime environment sub-component 124 provides a runtime environment (interpreter) for executing the sub-programs under test.

In some examples, the source database 130 is a static database that contains known sinks, e.g., names, types. In some examples, the sink database 132 is a static database that contains known sources, e.g., names, types. In some examples, the sanitizer database 134 is a static database that contains known sanitizers, e.g., names, types, application area/context.

Figure 2A:
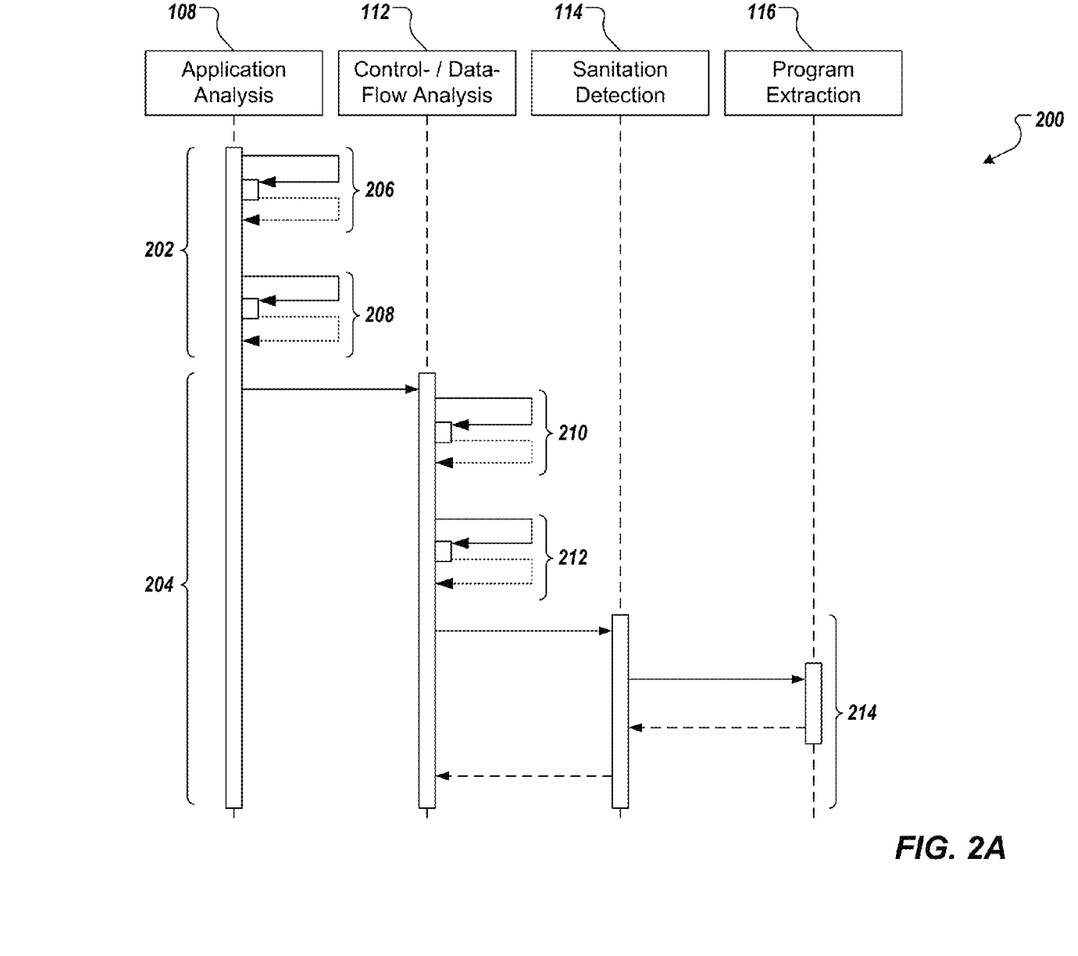
FIGS. 2A and 2B depict example sequence diagrams in accordance with implementations of the present disclosure.

Referring now to FIGS. 2A and 2B, an example sequence 200 will be described in accordance with implementations of the present disclosure. FIG. 2A depicts an example abstraction/translation sub-sequence 202 and an example static analysis sub-sequence 204. The example abstraction/translation sub-sequence 202 includes a source code reading sub-sequence 206, and an abstract representation generation sub-sequence 208. In some example, the source code of the program under test (the program that is being analyzed) is read (206), and is translated (208) into an abstract representation that is independent from the actual input language, e.g., Java, JavaScript, Bytecode. In some examples, the abstract representation includes a graph representation that includes nodes representing the program statements and edges between nodes. In some examples, the graph representation can include a tree representation that includes nodes, e.g., a root node, intermediate nodes, leaf nodes, and edges between nodes, as discussed herein. On this abstract representation, dataflows and control-flows are analyzed. In some implementations, the abstract interpretation is analyzed using abstract interpretation to determine the control-flows and dataflows.

In some implementations, the static analysis sub-sequence 204 uses the abstract representation, and includes a control-flow and dataflow computation sub-sequence 210, a source/sink pair computation sub-sequence 212, and a detection/extraction of sanitizer context sub-sequence 214. During the control-flow and dataflow computation sub-sequence 210, a super-set of all control-flows and dataflows is provided, e.g., as a super-graph. Using the super-set of all control-flows and dataflows, a search is conducted for sources. In some examples, a list of sources to be searched for is provided from a source database, e.g., the source database 130 of FIG. 1. Again, using the super-set of all control-flows and dataflows, a search is conducted for sinks. In some examples, a list of sinks to be searched for is provided from a sink database, e.g., the sink database 132 of FIG. 1. In some examples, for each source-sink-pair, the dataflows therebetween is computed during the source/sink pair computation sub-sequence 212.

During the detection/extraction of sanitizer context sub-sequence 214, the computed dataflows are analyzed, and dataflows that include candidate sanitizers are identified. In some examples, each dataflow is analyzed using a heuristic to detect all functions that might correctly sanitize, e.g., encode, the data for the sink of the particular dataflow. In some examples, the heuristic can be based on a usage pattern of the potential sanitizer, a signature of the potential sanitizer, naming conventions, and/or pre-configured sanitizer candidates, e.g., provided from the sanitizer database134 of FIG. 1. For each dataflow that includes a potential sanitizer, a sub-program is extracted together with corresponding program code, e.g., other locally defined functions, libraries, and the sub-program is stored. Further, each sub-program is extended such that the sub-programs are self-contained. In some examples, the context of the dataflow, e.g., the context description containing the type and encoding of the corresponding source and sink, and the code for executing the sub-program in isolation are stored. In some examples, different heuristics are used to minimize the actual sub-program, e.g., abstractions of the dataflow. In some examples, the static analysis sub-sequence 204 provides a list of candidate sanitizers with corresponding sub-programs.

Figure 2B:
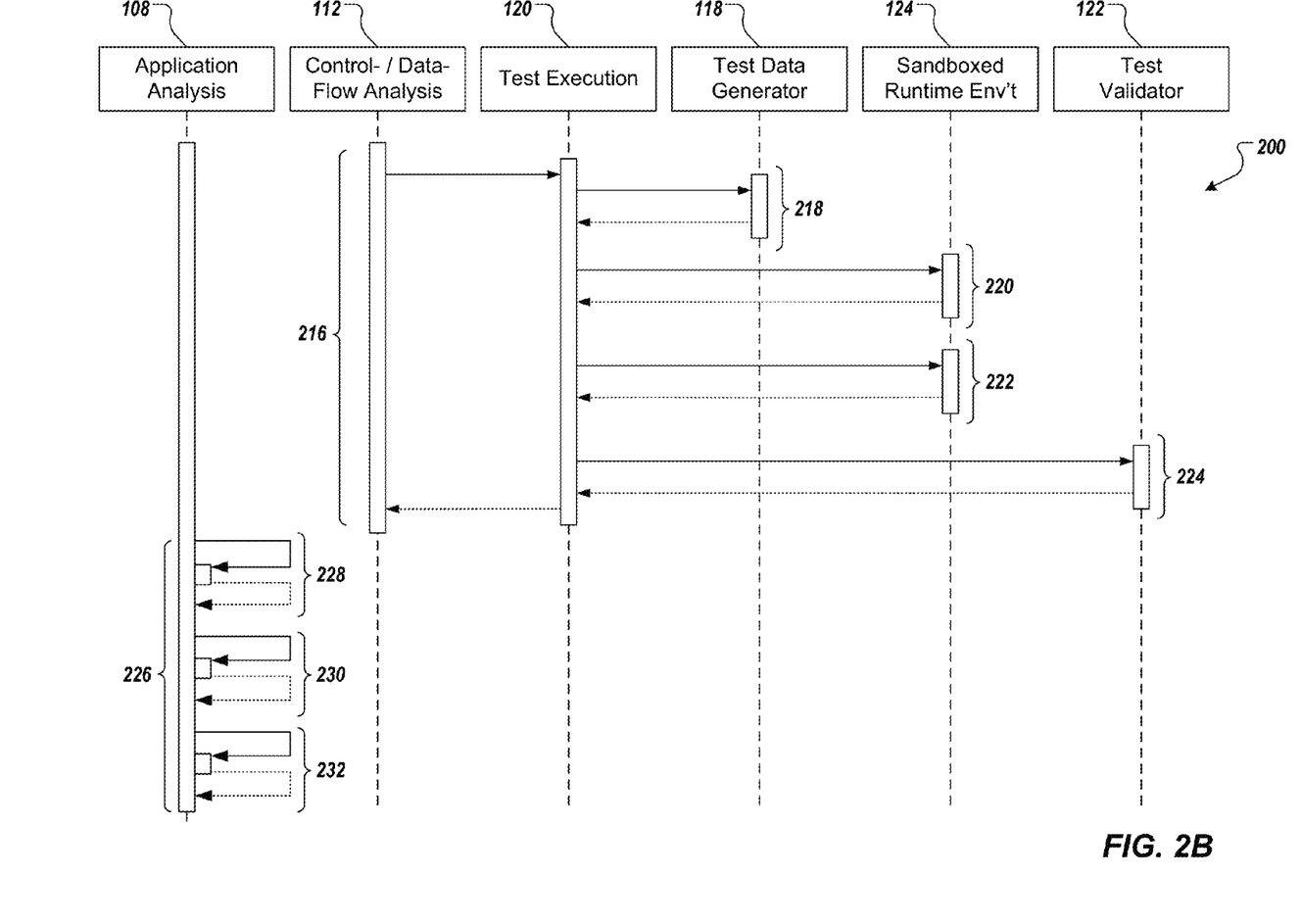

FIG. 2B depicts an example dynamic sanitizer analysis sub-sequence 216, and an example application analysis sub-sequence 226 of the example sequence 200. In some examples, the list of candidate sanitizers (from static analysis sub-sequence 204) is provided to the dynamic analysis sub-component 110. A test data generation sub-sequence 218 includes generating concrete test data for each candidate sanitizer provided in the list of candidate sanitizers. In some examples, the test data computation is based on the usage context and can, for example, use pre-defined abstract test data stored in a database, e.g., the parameterized test cases database 136 of FIG. 1.

A test preparation sub-sequence 220 includes initializing the test setup, e.g., a sandboxed runtime environment, by re-setting the runtime environment to a well-defined initial state and loading a sanitizer candidate into the runtime environment. A test execution sub-sequence 222 includes executing the test environment, and test results validation sub-sequence 224 includes evaluating results of the test run. In some examples, the detailed results of the test evaluation provide information that reflects the extent to which a sanitizer candidate is sanitizing the data for a specific source-sink pair. In some examples, the results can include how trustworthy, reliable and/or correct each candidate sanitizer is. This information is provided to the static analysis sub-component 108.

In the depicted example, the application analysis sub-sequence includes a static result and dynamic results combination sub-sequence 228, a results prioritization sub-sequence 230, and a results presentation sub-sequence 232. In some examples, during the static results and dynamic results combination sub-sequence 228, the results of the static analysis, e.g., the source-sink-pairs, are combined with the results of the dynamic analysis, e.g., how trustworthy/reliable/correct each candidate sanitizer is. During the results presentation sub-sequence 230, the dynamic results, i.e., the results of the dynamic analysis, are used to prioritize the combined results. In some examples, the source-sink-pairs can be prioritized, for example, as High Priority, Critical, Medium Priority, Low Priority, Safe (other categories, e.g., more fine-grained or more coarse grained, are also possible). In this manner, the order in which source-sink-pairs and respective sanitizer(s) should be checked can be provided based on priority, e.g., check High Priority first, and Safe last (if at all). During the results presentation sub-sequence 232, the combined results with priorities are provided in a format that is can be displayed to and understood by a user, e.g., a developer or security expert.

Implementations of the present disclosure will be discussed in further detail herein with reference to an example portion of source code. The example portion of source code is provided as:

```
function foobar(x){
    x = x.replace(/</g,"<").replace(/>/g,">");
    return x;
}
var a = getElementById("id").value;      // source
a = sanitizeHTML(a);
a = foobar(a);
document.write(a);                       // sink
```

In this example source code, getElementById("id").value is an untrusted source, document.write ( ), is a security-critical sink, and is a known, e.g., pre-configured, sanitizer for hypertext mark-up language (HTML) output.

Without implementations of the present disclosure, e.g., using previous SAST tool, the dataflow from getElementById("id").value to document.write() would be classified as safe, because there is a well-known sanitation function for sanitizing the input. Further, the sanitation function matches the source and sink types, further boosting the confidence, again without implementations of the present disclosure, that the dataflow is indeed safe. However, no consideration is given as to whether the function foobar( ), which might be an unknown and/or user-defined function, invalidates the sanitation.

Accordingly, the example source code can be processed to perform static analysis and dynamic analysis, in accordance with implementations of the present disclosure, to ensure that the source code is indeed safe. More specifically, source code that includes the example portion is processed to identify sub-portions (sub-programs) that influence sinks More particularly, and as discussed above, an abstract representation of the source code can be generated, and the abstract representation can be processed to provide a super-set of all control-flows and dataflows is provided, e.g., as a super-graph. As also discussed above, the computed dataflows are analyzed, e.g., using heuristics, and dataflows that include candidate sanitizers are identified. For each dataflow that includes a potential sanitizer, a sub-program is extracted.

Each sub-program influences the argument of the sink. For example, the above-provided example portion can be processed to identify the following example sub-program:

```
var a = getElementById("id").value;
a = sanitizeHTML(a);
a = foobar(a);
```

Each identified sub-program is processed to be executable. In some examples, the code of the sub-program is made executable (self-contained) by removing the sink, and embedding the code in a function skeleton that enables the code to be called directly. For example, the example sub-program above can be processed to provide:

```
function codeUnderTest(a){
    a = sanitizeHTML(a);
    a = foobar(a);
    return a;
}
```

As discussed above, static results are provided and can include an index of source-sink-pairs, candidate sanitizers and corresponding sub-programs. In view of the example source code provided above, and example index can include:

```
[getElementById("id").value, document.write( ), sanitizeHTML( )]
...
[..., ..., ...]
``` provided in the format: [source, sink, sanitizer].

For each identified sub-program, dynamic analysis is performed. For example, and as discussed above, for each identified sub-program, a test case is generated. In some examples, and as discussed above, test cases are generated based on context and/or specified sanitizers. In some examples, context can include the particular source(s) and the particular sink(s) influenced by the sub-program. In some examples, the test data enables a determination to be made as to whether the sub-program, e.g., codeUnderTest, sanitizes the input. An example test case for the example sub-program above can be provided as:

```
check(codeUnderTest("<script>...</script>"),
    not_contain_tag.curry("<script>"));
check(codeUnderTest("<"), not_contain_strings.curry(["<"]));
check(codeUnderTest("<"),
    not_contain_strings.curry(["<"]));
check(codeUnderTest("<script>...</script>"),
    not_contain_.curry(["<"]));
check(codeUnderTest("&"),
    not_contain_strings.curry(["&"]));
check(codeUnderTest("&"), not_contain_strings.curry(["&"]));
```

Each sub-program is executed in an isolated environment, e.g., sandboxed environment, based on the corresponding test case, and dynamic results are generated. In the example test case provided above, check checks whether codeUnderTest correctly sanitizes data in the dataflow, e.g., including input or output encoding. In this example, the result of this dynamic analysis reveals that codeUnderTest does not securely eliminate tags such as <script> . . . </script>. The dynamic analysis result can be used to prioritize the criticality of the analyzed dataflow, e.g., depending on the scope of the sanitation. As discussed above, the dynamic analysis results can include an indication as to how trustworthy, reliable and/or correct each candidate sanitizer is.

The static results and the dynamic results are combined. For example, the index of the static results is revised to include the indications provided from the dynamic results. As discussed above, the combined results, e.g., the revised index, are processed to prioritize the results. In this manner, the order in which source-sink-pairs and respective sanitizer(s) should be checked can be provided based on priority, e.g., check High Priority first, and Safe last (if at all). The combined results with priorities are provided in a format that is can be displayed to and understood by a user, e.g., a developer or security expert.

Figure 3:
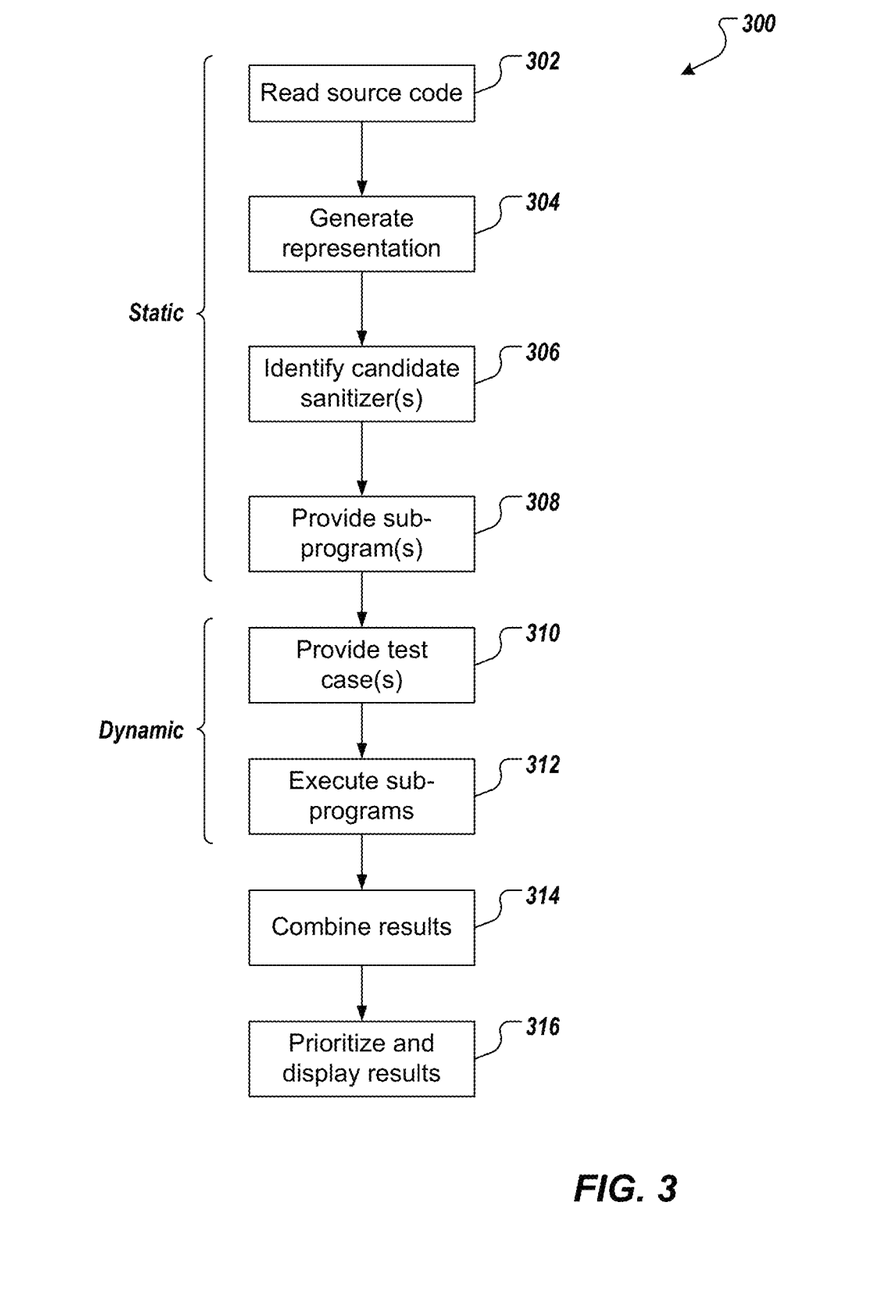
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices.

Source code is read (302). For example, source code corresponding to a program under test is received from a repository, e.g., the application analysis component 102 receives the source code 104 from the source code database 106 in FIG. 1. A representation of the source code is generated (304). For example, the static analysis sub-component 108 of FIG. 1 can generate the representation. In some examples, the representation includes an abstract representation provided as a graph including nodes and edges between nodes. One or more candidate sanitizers are identified (306). For example, the static analysis sub-component 108 of FIG. 1 identifies the one or more candidate sanitizers. In some examples, the representation is processed to provide control-flows and dataflows for the program under test. In some examples, source-sink-pairs and corresponding sanitizers are identified from the dataflows. One or more sub-programs are provided (308). For example, the static analysis sub-component 108 of FIG. 1 can extract a respective sub-program for each candidate sanitizer.

One or more test cases are provided (310). For example, the dynamic analysis sub-component 110 of FIG. 1 can provide the one or more test cases, e.g., based on test cases stored in the parameterized test case database 136. In some examples, at least one test case is provided for each sub-program, i.e., each candidate sanitizer. The one or more sub-programs are executed 312. For example, the dynamic analysis sub-component 110 of FIG. 1 can execute each sub-program in an isolated environment to process respective test cases and generate dynamic results.

Static results and dynamic results are combined to provide combined results (314). For example, the application analysis component 102 of FIG. 1 can provide the combined results. Results within the combined results are prioritized and are provided for display (316).

Figure 4:
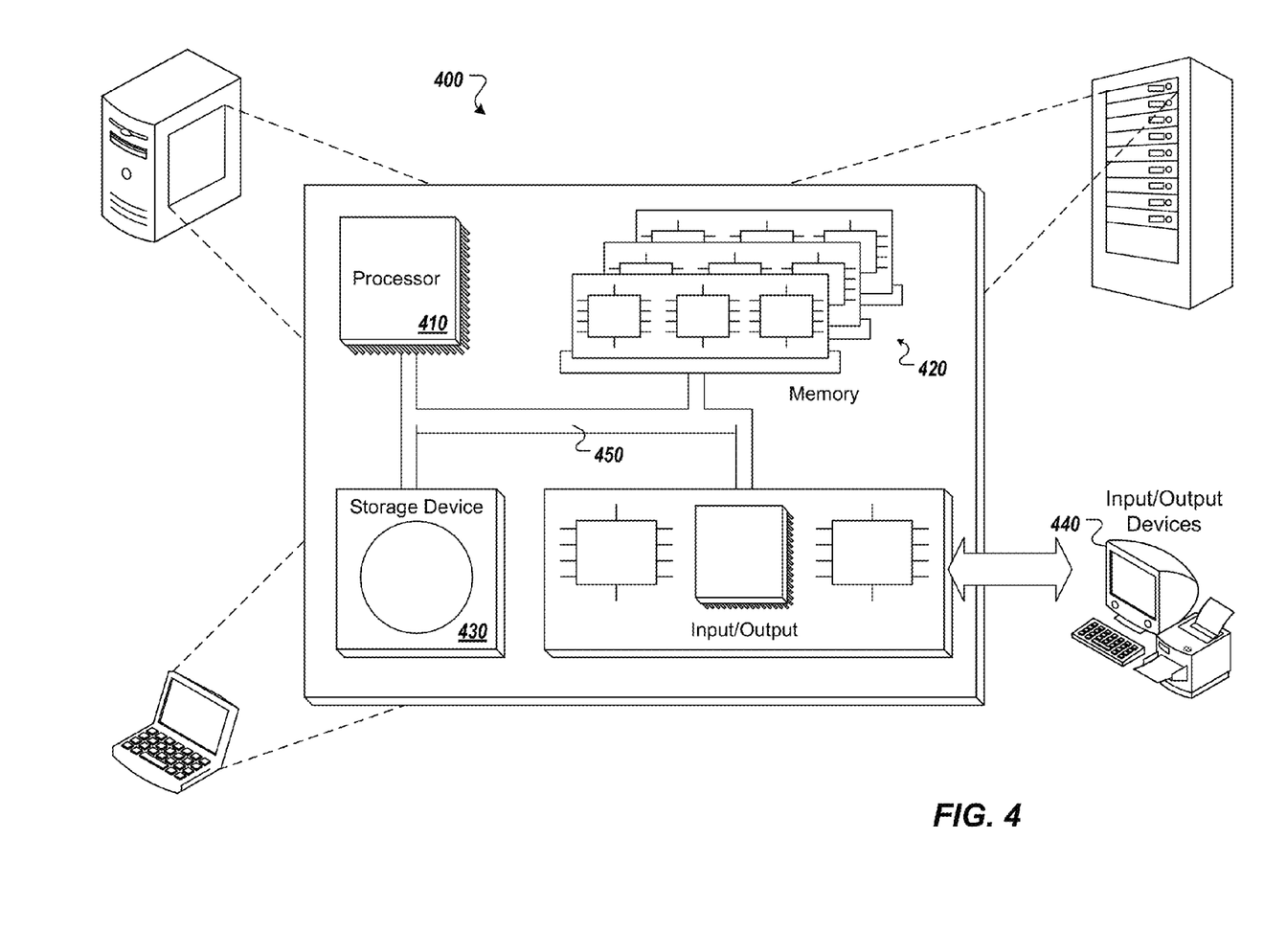
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for analyzing security of dataflows in programs, the method being executed using one or more processors and comprising:
    processing, by the one or more processors, source code using static analysis to:
        identify one or more dataflows and one or more candidate sanitizers, each candidate sanitizer being associated with a respective dataflow, and
        provide an executable sub-program for each candidate sanitizer to provide one or more executable sub-programs,
    processing, by the one or more processors, the one or more executable sub-programs using dynamic analysis to:
        execute the one or more executable sub-programs, and
        provide dynamic analysis results,
    providing combined results based on the static analysis and the dynamic analysis, the combined results comprising the dynamic analysis results; and
    assigning a priority to each result in the combined results.

2. The method of claim 1, wherein processing source code comprises providing a representation of the source code, the one or more dataflows being identified from the representation.

3. The method of claim 2, wherein the representation comprises a graph comprising nodes and edges between nodes.

4. The method of claim 1, wherein providing an executable sub-program for each candidate sanitizer comprises:
    extracting a sub-program from the source code;
    removing one or more sinks present in the sub-program; and
    embedding code of the sub-program in a function skeleton that enables the code to be called directly.

5. The method of claim 1, further comprising providing static analysis results based on processing the source code using static analysis.

6. The method of claim 5, wherein the static analysis results comprise source-sink-pairs, the one or more candidate sanitizers, and the one or more executable sub-programs.

7. The method of claim 5, wherein the combined results further comprise the static analysis results.

8. The method of claim 1, wherein processing the one or more executable sub-programs using dynamic analysis comprises providing one or more test cases for the one or more executable sub-programs.

9. The method of claim 8, wherein a test case of the one or more test cases is provided based on a context of a respective executable sub-program.

10. The method of claim 9, wherein the context comprises at least one of a source associated with a candidate sanitizer of the respective executable program, and a sink associated with the candidate sanitizer of the respective executable program.

11. The method of claim 8, wherein a test case of the one or more test cases is provided based on a candidate sanitizer associated with a respective executable sub-program.

12. The method of claim 8, wherein executing the one or more executable programs comprises executing each executable sub-program based on a respective test case.

13. The method of claim 1, wherein executing the one or more executable sub-programs comprises executing each executable sub-program in isolation.

14. The method of claim 1, wherein the dynamic results indicate whether each candidate sanitizer properly functions.

15. The method of claim 1, further comprising providing the combined results and respective priorities for display to a user.

16. A non-transitory computer-readable storage medium coupled to one or more processors and having instructions stored thereon which, when executed by the one or more processors, cause the one or more processors to perform operations for analyzing security of dataflows in programs, the operations comprising:
   processing source code using static analysis to:
      identify one or more dataflows and one or more candidate sanitizers, each candidate sanitizer being associated with a respective dataflow, and
      provide an executable sub-program for each candidate sanitizer to provide one or more executable sub-programs,
   processing the one or more executable sub-programs using dynamic analysis to:
      execute the one or more executable sub-programs, and
      provide dynamic analysis results,
   providing combined results based on the static analysis and the dynamic analysis, the combined results comprising the dynamic analysis results; and
   assigning a priority to each result in the combined results.

17. A system, comprising:
   a computing device; and
   a computer-readable storage device coupled to the computing device and having instructions stored thereon which, when executed by the computing device, cause the computing device to perform operations for analyzing security of dataflows in programs, the operations comprising:
      processing source code using static analysis to:
         identify one or more dataflows and one or more candidate sanitizers, each candidate sanitizer being associated with a respective dataflow, and
         provide an executable sub-program for each candidate sanitizer to provide one or more executable sub-programs,
      processing the one or more executable sub-programs using dynamic analysis to:
         execute the one or more executable sub-programs, and
         provide dynamic analysis results,
      providing combined results based on the static analysis and the dynamic analysis, the combined results comprising the dynamic analysis results; and
      assigning a priority to each result in the combined results.

* * * * *